United States Patent
Okada

(10) Patent No.: US 11,875,072 B2
(45) Date of Patent: Jan. 16, 2024

(54) PRINTING SYSTEM FOR AUTHENTICATING PRINTING, HAS PRINTING SERVER THAT TRANSMITS CHANGE AUTHENTICATION SETTING INFORMATION TO TERMINAL DEVICE, AND NON-TRANSITORY COMPUTER-READABLE STORAGE MEDIUM STORING COMPUTER PROGRAM

(71) Applicant: SEIKO EPSON CORPORATION, Tokyo (JP)

(72) Inventor: Hiromu Okada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/659,923

(22) Filed: Apr. 20, 2022

(65) Prior Publication Data

US 2022/0342617 A1  Oct. 27, 2022

(30) Foreign Application Priority Data

Apr. 21, 2021  (JP) ................................ 2021-071950

(51) Int. Cl.
*G06F 3/12* (2006.01)
(52) U.S. Cl.
CPC ............ *G06F 3/1238* (2013.01); *G06F 3/126* (2013.01); *G06F 3/1222* (2013.01); *G06F 3/1255* (2013.01); *G06F 2221/2141* (2013.01)
(58) Field of Classification Search
None
See application file for complete search history.

(56) References Cited

U.S. PATENT DOCUMENTS

| | | | |
|---|---|---|---|
| 2008/0183573 A1* | 7/2008 | Muschetto | G06Q 30/0242 705/14.73 |
| 2012/0229838 A1* | 9/2012 | Mogaki | G06F 21/608 358/1.14 |
| 2013/0250343 A1* | 9/2013 | Tachi | H04N 1/4433 358/1.14 |

(Continued)

FOREIGN PATENT DOCUMENTS

JP    2009-139991 A    6/2009

*Primary Examiner* — Haris Sabah
(74) *Attorney, Agent, or Firm* — WORKMAN NYDEGGER

(57) ABSTRACT

A printing system includes a terminal device, a printing server that receives print data from the terminal device, and a printing device that performs printing based on the print data received by the printing server. The terminal device stores terminal authentication printing setting information indicating a setting relating to authentication printing and set in the terminal device. The printing server stores change authentication printing setting information for changing the terminal authentication printing setting information. The terminal device transmits, to the printing server, request information requesting the change authentication printing setting information. The printing server transmits the change authentication printing setting information to the terminal device upon receiving the request information. The terminal device changes the terminal authentication printing setting information based on the change authentication printing setting information received from the printing server.

11 Claims, 8 Drawing Sheets

(56) References Cited

U.S. PATENT DOCUMENTS

| | | | |
|---|---|---|---|
| 2015/0109638 A1* | 4/2015 | Sasaki | H04N 1/00954 358/1.15 |
| 2015/0205559 A1* | 7/2015 | Miyata | G06F 3/1288 358/1.15 |
| 2016/0277379 A1* | 9/2016 | Sasaki | G06F 21/608 |
| 2020/0192617 A1* | 6/2020 | Otsuka | G06F 3/1258 |

* cited by examiner

PRINTING SYSTEM FOR AUTHENTICATING PRINTING, HAS PRINTING SERVER THAT TRANSMITS CHANGE AUTHENTICATION SETTING INFORMATION TO TERMINAL DEVICE, AND NON-TRANSITORY COMPUTER-READABLE STORAGE MEDIUM STORING COMPUTER PROGRAM The present application is based on, and claims priority from JP Application Serial Number 2021-071950, filed Apr. 21, 2021, the disclosure of which is hereby incorporated by reference herein in its entirety.

BACKGROUND

1. Technical Field

The present disclosure relates to a printing system, a terminal device, a storage medium storing a program, and a printing server.

2. Related Art

Authentication printing in which printing is performed when user authentication is successful is known. For example, in a printing system described in JP-A-2009-139991, in authentication printing, a server transmits a print instruction to a terminal device after the completion of authentication, the terminal device transmits a print job stored in the terminal device to a printing device based on the print instruction received, and the printing device performs printing based on the print job received.

In authentication printing, a configuration in which a print job is transmitted directly to a printing device from a terminal device as described in JP-A-2009-139991 and a configuration in which a print job is transmitted from the terminal device to the printing device via a server are used. In authentication printing using this configuration, it is necessary to set a setting relating to the authentication printing in each of the terminal device and the server. However, when an OS of the terminal device is different from an OS of the server, there is a problem that it is necessary for a user to manually set a setting relating to the authentication printing in the terminal device and it takes time and effort.

SUMMARY

To solve the problems described above, according to an aspect of the present disclosure, a printing system that performs authentication printing includes a terminal device, a printing server that receives print data from the terminal device, and a printing device that performs printing based on the print data received by the printing server. The terminal device stores terminal authentication printing setting information indicating a setting relating to the authentication printing and set in the terminal device. The printing server stores change authentication printing setting information for changing the terminal authentication printing setting information. The terminal device transmits, to the printing server, request information requesting the change authentication printing setting information. The printing server transmits the change authentication printing setting information to the terminal device upon receiving the request information. The terminal device changes the terminal authentication printing setting information based on the change authentication printing setting information received from the printing server.

To solve the problems described above, according to another aspect of the present disclosure, a terminal device performs authentication printing together with a printing server and a printing device that performs printing based on print data received from the printing server. The terminal device includes a print data transmitter that transmits the print data to the printing server, a terminal storage unit that stores terminal authentication printing setting information indicating a setting relating to the authentication printing and set in the terminal device, a request information transmitter that transmits, to the printing server, request information requesting change authentication printing setting information for changing the terminal authentication printing setting information, an authentication printing setting information receiver that receives the change authentication printing setting information from the printing server after the printing server receives the request information, and a changer that changes the terminal authentication printing setting information stored in the terminal storage unit based on the received change authentication printing setting information when the authentication printing setting information receiver receives the change authentication printing setting information.

To solve the problems described above, according to still another aspect of the present disclosure, a non-transitory computer-readable storage medium stores a program to be executed by a processor of a terminal device that performs authentication printing together with a printing server and a printing device that performs printing based on print data received from the printing server. The terminal device stores terminal authentication printing setting information indicating a setting relating to the authentication printing and set in the terminal device. The program includes causing the processor to transmit the print data to the printing server, transmit, to the printing server, request information requesting change authentication printing setting information for changing the terminal authentication printing setting information, receive the change authentication printing setting information from the printing server after the printing server receives the request information, and change the terminal authentication printing setting information based on the received change authentication printing setting information when the processor receives the change authentication printing setting information.

To solve the problems described above, according to still another aspect of the present disclosure, a printing server performs authentication printing together with a terminal device and a printing device. The printing server includes a server print data transmitter that transmits, to the printing device, print data received from the terminal device, a server storage unit that stores change authentication printing setting information for changing terminal authentication printing setting information indicating a setting relating to the authentication printing and set in the terminal device, a request information receiver that receives, from the terminal device, request information requesting the change authentication printing setting information, and an authentication printing setting information transmitter that transmits, to the terminal device storing the terminal authentication printing setting information, the change authentication printing setting information stored in the server storage unit when the request information receiver receives the request information.

DESCRIPTION OF EXEMPLARY EMBODIMENTS

Figure 1:
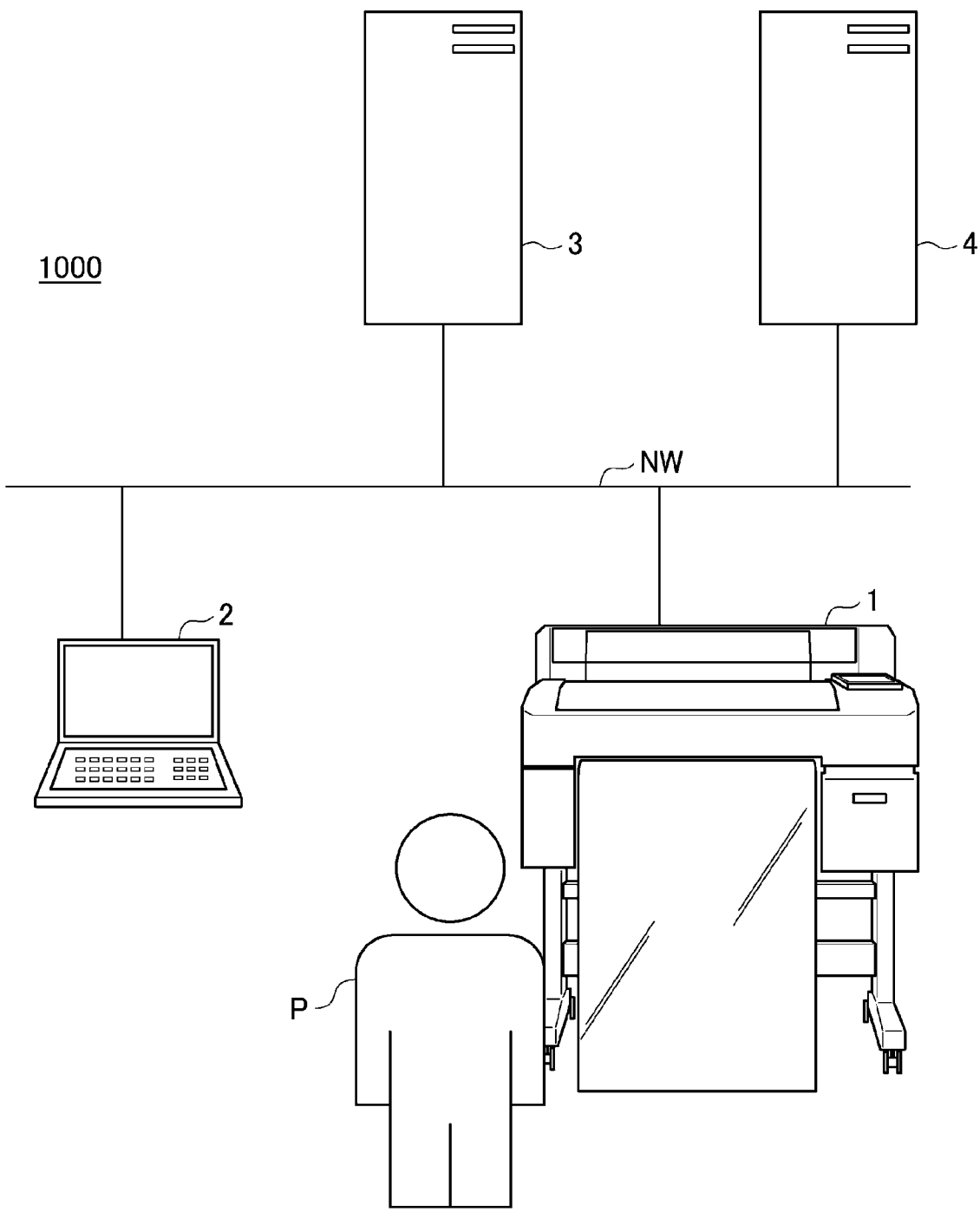
FIG. 1 is a diagram illustrating a configuration of a printing system.

FIG. 1 is a diagram illustrating a configuration of a printing system 1000.

As illustrated in FIG. 1, the printing system 1000 includes a printing device 1, a terminal device 2, a printing server 3, and an authentication server 4. The printing device 1, the terminal device 2, the printing server 3, and the authentication server 4 are connected to a network NW. The network NW may be a local network, a global network, or a network including the local network and the global network. The global network includes the Internet, a telephone line, and another communication network.

The printing system 1000 performs authentication printing.

In the printing system 1000, in the authentication printing, the printing device 1 accepts an operation relating to user authentication from a user P and the authentication server 4 performs the user authentication based on the accepted operation relating to the user authentication. In the printing system 1000, in the authentication printing, when the user authentication is successful, the printing device 1 that has accepted the operation relating to the user authentication performs printing based on print data 3131 desired by the user P.

The printing device 1 prints an image on a print medium. The type of the print medium is not limited. Examples of the print medium are cut paper of a predetermined size, roll paper, and a sheet made of synthetic resin. The printing method of the printing device 1 is not limited and may be dot impact printing, thermal sublimation printing, and other thermal printing.

In the present embodiment, as the printing device 1, a large format printer that uses an ink jet method to eject ink onto a relatively large print medium to perform printing on the print medium is exemplified. As the print medium of the large format printer, for example, a print medium such as high-quality paper, cast paper, art paper, coated paper, synthetic paper, a film made of polyethylene terephthalate (PET), polypropylene (PP), or the like, or fabric can be used.

The printing device 1 performs printing based on the print data 3131 received from the printing server 3. In addition, the printing device 1 accepts an operation relating to user authentication. When the user authentication is successful in the authentication server 4, the printing device 1 performs printing based on the print data 3131 received from the printing server 3.

The terminal device 2 is a personal computer (PC). In FIG. 1, a laptop PC is exemplified as the terminal device 2. However, the terminal device 2 may be a desktop PC, a tablet PC, or a smartphone. In the terminal device 2, a terminal printer driver 212 is installed. The terminal printer driver 212 is described later. By installing the terminal printer driver 212 in the terminal device 2, a print queue is generated in the terminal device 2. The print queue is hereinafter referred to as "terminal print queue" and is indicated by reference sign "214".

The terminal printer driver 212 corresponds to an example of a "program".

The printing server 3 is a server device that executes arithmetic processing based on a request from each client connected to the network NW or the like. In the printing server 3, a server printer driver 311 and a management program 312 are installed. The server printer driver 311 and the management program 312 are described later. By installing the server printer driver 311 in the printing server 3, a print queue for authentication printing is generated in the printing server 3. This print queue is hereinafter referred to as "server print queue" and indicated by reference sign "316".

The authentication server 4 is a server device that executes predetermined arithmetic processing based on a request from each client connected to the network NW or the like. The authentication server 4 provides, to the printing device 1, various screens relating to the print data 3131 stored in the printing server 3. The authentication server 4 functions as a web server and transmits, for each of the screens, an HTML file for displaying the screen to the printing device 1.

In each of the drawings, each of the printing server 3 and the authentication server 4 is represented as one block. However, this does not mean that each of the printing server 3 and the authentication server 4 is constituted by a single server device. For example, each of the printing server 3 and the authentication server 4 may include a plurality of server devices that execute different types of processing. In addition, in each of the drawings, the printing server 3 and the authentication server 4 are exemplified as separate server devices. However, the printing server 3 and the authentication server 4 may be configured as the same server device.

In addition, the present embodiment exemplifies the case where the printing system 1000 includes the single printing device 1. However, the number of printing devices 1 included in the printing system 1 is not limited to one and may be two or more. In addition, the present embodiment exemplifies the case where the printing system 1000 includes the single terminal device 2. However, the number of terminal devices 2 included in the printing system 1000 is not limited to one and may be two or more.

Next, configurations of the printing device 1, the terminal device 2, the printing server 3, and the authentication server 4 are described.

First, the printing device 1 and the terminal device 2 are described.

Figure 2A:
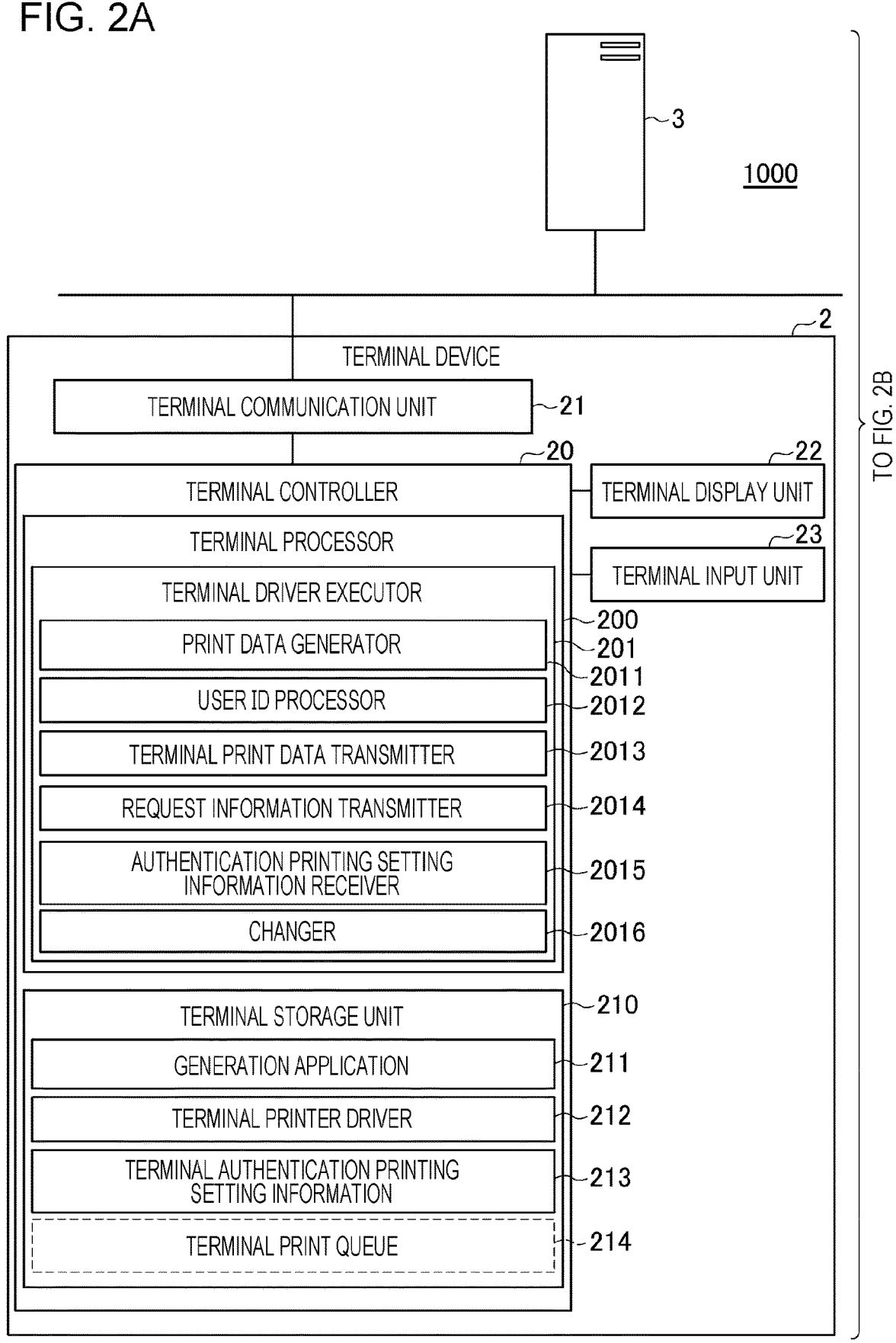
FIGS. 2A and 2B are block diagrams illustrating a configuration of a printing device and a configuration of a terminal device.
Figure 2B:
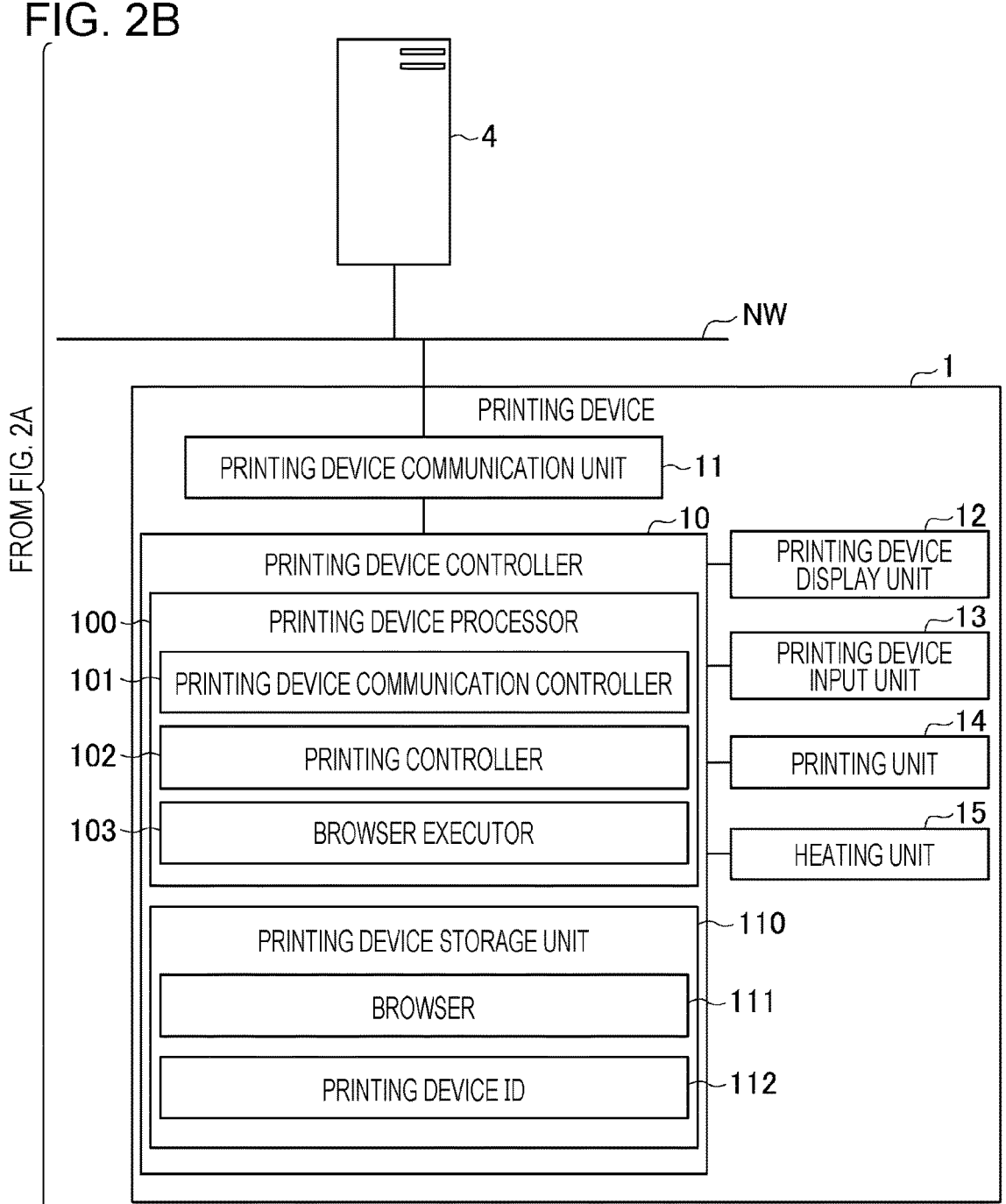

FIGS. 2A and 2B are block diagrams illustrating the configuration of the printing device 1 and the configuration of the terminal device 2.

The printing device 1 includes a printing device controller 10, a printing device communication unit 11, a printing device display unit 12, a printing device input unit 13, a printing unit 14, and a heating unit 15.

The printing device controller 10 includes a printing device processor 100 and a printing device storage unit 110. The printing device processor 100 is a processor such as a central processing unit (CPU) or a micro-processing unit (MPU). The printing device controller 10 controls the units of the printing device 1 by causing the printing device processor 100 to read and execute a control program stored in the printing device storage unit 110. The printing device processor 100 functions as a printing device communication controller 101 and a printing controller 102 by reading and executing the control program. In addition, the printing device processor 100 functions as a browser executor 103 by reading and executing a browser 111.

The printing device storage unit 110 includes a memory that stores a program to be executed by the printing device processor 100 and data to be processed by the printing device processor 100. The printing device storage unit 110 stores the control program to be executed by the printing device processor 100, the browser 111, a printing device ID 112 that is identification information of the printing device 1, and other various data. The printing device storage unit 110 includes a nonvolatile memory. The printing device storage unit 110 further includes a volatile memory that may constitute a work area for the printing device processor 100.

The printing device communication unit 11 is a communication interface having a communication circuit, a connector, and the like that conform to a predetermined communication standard. The printing device communication unit 11 communicates with the printing server 3 and the authentication server 4 in accordance with the predetermined communication standard under control by the printing device controller 10.

The printing device display unit 12 includes a plurality of light emitting diodes (LEDs) and a display panel. The printing device display unit 12 turns on and off the LEDs or causes the LEDs to blink and displays information on the display panel in accordance with control by the printing device controller 10.

The printing device input unit 13 includes a first input unit such as an operation switch included in the printing device 1 or a touch panel included in the printing device 1. The printing device input unit 13 detects an operation performed by the user P on the first input unit and outputs information regarding the operation to the printing device controller 10. The printing device controller 10 performs, based on the input from the printing device input unit 13, processing corresponding to the operation performed on the first input unit. The printing device input unit 13 includes a second input unit to be used by the user P to enter authentication information NJ in the printing device 1. An example of the second input unit is a card reader that reads an IC card or the like that stores the authentication information NJ of the user P. The entry method of the user P is not limited to this example. For example, the user P may enter a combination of a user ID 4111 and a password 4112 as the authentication information NJ in the operation switch or the touch panel or may enter the authentication information NJ via fingerprint authentication. In the present embodiment, the combination of the user ID 4111 and the password 4112 is exemplified as the authentication information NJ, but the authentication information NJ is not limited thereto. For example, when fingerprint authentication is to be performed, information indicating a fingerprint may be used instead of the password 4112. The user ID 4111 is identification information identifying the user P in authentication printing. The password 4112 is a password to be used in the user authentication.

The printing unit 14 includes a configuration relating to printing. That is, the printing unit 14 includes an ink jet head that forms a dot by ejecting ink on a print medium, a carriage that operates the ink jet head in a scan direction, a carriage drive motor that drives the carriage, a transport unit that transports the print medium, an ink supply unit that supplies ink to the ink jet head, and the like. The printing unit 14 performs printing on the print medium by ejecting ink from a nozzle of the ink jet head to form a dot on a print surface of the transported print medium in accordance with control by the printing device controller 10.

The heating unit 15 includes a heater that dries and fixes ink on the print medium. The heating unit 15 heats the print medium transferred in a transport path in accordance with control by the printing device controller 10.

As described above, the printing device processor 100 functions as the printing device communication controller 101, the printing controller 102, and the browser executor 103.

The printing device communication controller 101 communicates with the printing server 3 and the authentication server 4 via the printing device communication unit 11.

The printing controller 102 controls the printing unit 14 and the heating unit 15 to perform printing based on the print data 3131 received from the printing server 3.

The browser executor 103 transmits an authentication screen request to the authentication server 4 via the printing device communication unit 11. The authentication screen request is information requesting an HTML file for displaying an authentication screen relating to the user authentication. Upon receiving the HTML file for displaying the authentication screen from the authentication server 4, the browser executor 103 causes the printing device display unit 12 to display the authentication screen. The authentication screen includes information that prompts to enter the authentication information NJ and indicates, for example, that "Please put an IC card above the card reader." and "Please enter a user ID and a password.". The browser executor 103 accepts the authentication information NJ entered by the user P via the authentication screen. After that, the browser executor 103 transmits the accepted authentication information NJ to the authentication server 4.

In addition, the browser executor 103 transmits an operation screen request to the authentication server 4 via the printing device communication unit 11. The operation screen request is information requesting an HTML file for displaying a printing start instruction operation screen. The printing start instruction operation screen is a screen for the user P to perform an operation to instruct to start printing. The operation screen request includes the authentication information NJ entered by the user P. Upon receiving the HTML file for displaying the printing start instruction operation screen, the browser executor 103 causes the printing device display unit 12 to display the printing start instruction operation screen. The browser executor 103 accepts an instruction to start printing from the user P via the printing start instruction operation screen and transmits, to the authentication server 4, an authentication printing start request to start the authentication printing.

Next, the configuration of the terminal device 2 is described.

The terminal device 2 includes a terminal controller 20, a terminal communication unit 21, a terminal display unit 22, and a terminal input unit 23.

The terminal controller 20 includes a terminal processor 200 and a terminal storage unit 210. The terminal processor 200 is a processor such as a CPU or an MPU. The terminal controller 20 controls the units of the terminal device 2 by causing the terminal processor 200 to read and execute a control program stored in the terminal storage unit 210. In addition, the terminal processor 200 functions as a terminal driver executor 201 by reading and executing the terminal printer driver 212 stored in the terminal storage unit 210.

The terminal processor 200 corresponds to an example of a processor. The terminal printer driver 212 corresponds to an example of a program.

The terminal storage unit 210 includes a memory that stores a program to be executed by the terminal processor 200 and data to be processed by the terminal processor 200. The terminal storage unit 210 stores the control program to be executed by the terminal processor 200, a generation application 211, the terminal printer driver 212, terminal authentication printing setting information 213, and other various data. The terminal storage unit 210 includes a nonvolatile memory. The terminal storage unit 210 further includes a volatile memory that may constitute a work area for the terminal processor 200.

The generation application 211 is an application program that generates data such as a document and an image.

The terminal printer driver 212 is a program having a function of generating the print data 3131 based on the data generated by the generation application 211. The print data 3131 includes a print command, a printing condition such as the number of sheets to be printed, and the data generated by the generation application 211. The print command is a command supporting a command specification of the printing device 1.

The terminal authentication printing setting information 213 is information indicating a setting relating to the authentication printing and set in the terminal device 2. The terminal authentication printing setting information 213 includes a combination of a setting item and a setting value associated with the setting item. The terminal authentication printing setting information 213 according to the present embodiment includes a print queue setting item and a user ID setting item. The print queue setting item is a setting item in which an output destination of the terminal print queue 214 is set as a setting value. The user ID setting item is a setting item in which a setting value indicating whether a process relating to the user ID 4111 is valid or invalid. The process relating to the user ID 4111 includes the acceptance of the entry of the user ID 4111 and the addition of the user ID 4111 to the print data 3131. The terminal authentication printing setting information 213 is stored in the terminal storage unit 210 at the time of the installation of the terminal printer driver 212. A default setting value is set in a setting item of the terminal printer driver 212 in a default state. For example, a setting value indicating that the output destination is not set is set in a print queue setting item of the terminal printer driver 212 in the default state.

The terminal communication unit 21 is a communication interface having a communication circuit, a connector, and the like that conform to the predetermined communication standard and communicates with the printing server 3 in accordance with control by the terminal controller 20.

The terminal display unit 22 includes an LED, a display panel, and the like and displays various information in accordance with control by the terminal controller 20.

The terminal input unit 23 includes an input unit such as an operation switch included in the terminal device 2, a touch panel, a mouse, a keyboard, or the like. The terminal input unit 23 detects an operation performed on the input unit by the user P and outputs a result of the detection to the terminal controller 20. The terminal controller 20 executes, based on the input from the terminal input unit 23, processing corresponding to the operation performed on the input unit.

As described above, the terminal processor 200 functions as the terminal driver executor 201. The terminal driver executor 201 functions as a print data generator 2011, a user ID processor 2012, a terminal print data transmitter 2013, a request information transmitter 2014, an authentication printing setting information receiver 2015, and a changer 2016.

The print data generator 2011 generates the print data 3131 based on the data generated by the generation application 211. The print data generator 2011 accepts a printing condition from the user P and generates the print data 3131 based on the accepted printing condition.

The user ID processor 2012 references the terminal authentication printing setting information 213 and causes the terminal display unit 22 to display an entry screen for entering the user ID 4111 when a valid setting value is set in the user ID setting item. In addition, when the valid setting value is set in the user ID setting item of the terminal authentication printing setting information 213, the user ID processor 2012 adds the user ID 4111 accepted on the entry screen to the print data 3131 generated by the print data generator 2011.

The terminal print data transmitter 2013 communicates with the printing server 3 via the terminal communication unit 21. The terminal print data transmitter 2013 transmits the print data 3131 generated by the print data generator 2011 to the printing server 3. When the user ID processor 2012 adds the user ID 4111 to the print data 3131, the terminal print data transmitter 2013 transmits the print data 3131 having the user ID 4111 added thereto to the printing server 3. When a setting value of the server print queue 316 is set in the print queue setting item of the terminal authentication printing setting information 213, the terminal print data transmitter 2013 transmits the print data 3131 having the user ID 4111 added thereto to the server print queue 316.

The request information transmitter 2014 communicates with the printing server 3 via the terminal communication unit 21. The request information transmitter 2014 transmits, to the printing server 3, request information requesting change authentication printing setting information 315. The change authentication printing setting information 315 is described later.

The authentication printing setting information receiver 2015 receives, from the printing server 3, the change authentication printing setting information 315 as a response to the request information transmitted by the request information transmitter 2014.

The changer 2016 determines whether a detail of the change authentication printing setting information 315 received by the authentication printing setting information receiver 2015 is different from a detail of the terminal authentication printing setting information 213. When the changer 2016 determines that the details are different, the changer 2016 changes the terminal authentication printing setting information 213 based on the received change authentication printing setting information 315.

More specifically, the changer 2016 compares the change authentication printing setting information 315 with the terminal authentication printing setting information 213. Then, the changer 2016 determines, for all setting items, whether the same setting value is set in setting items common to the change authentication printing setting information 315 and the terminal authentication printing setting information 213. When the same setting value is not set in the common setting items, the changer 2016 determines that the detail of the change authentication printing setting information 315 is different from the detail of the terminal authentication printing setting information 213. When the same setting value is set in the common setting items for all the setting items, the changer 2016 determines that the detail of the change authentication printing setting information 315 is the same as the detail of the terminal authentication printing setting information 213. When the changer 2016 determines that the detail of the change authentication printing setting information 315 is different from the detail of the terminal authentication printing setting information 213, the changer 2016 matches each setting value of the terminal authentication printing setting information 213 with each setting value of the change authentication printing setting information 315.

Next, the configuration of the authentication server 4 is described.

Figure 3A:
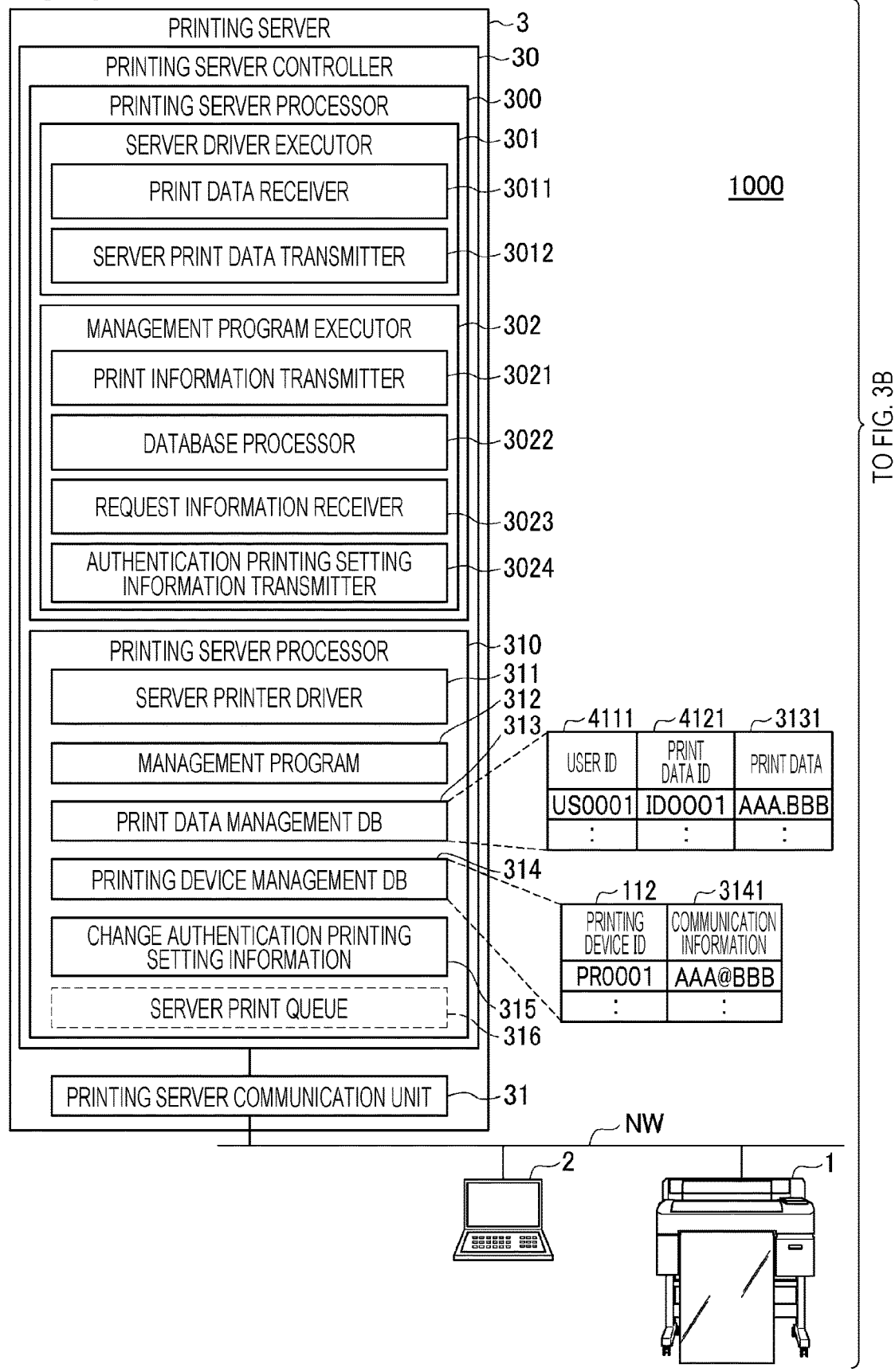
FIGS. 3A and 3B are block diagrams illustrating a configuration of a printing server and a configuration of an authentication server.
Figure 3B:
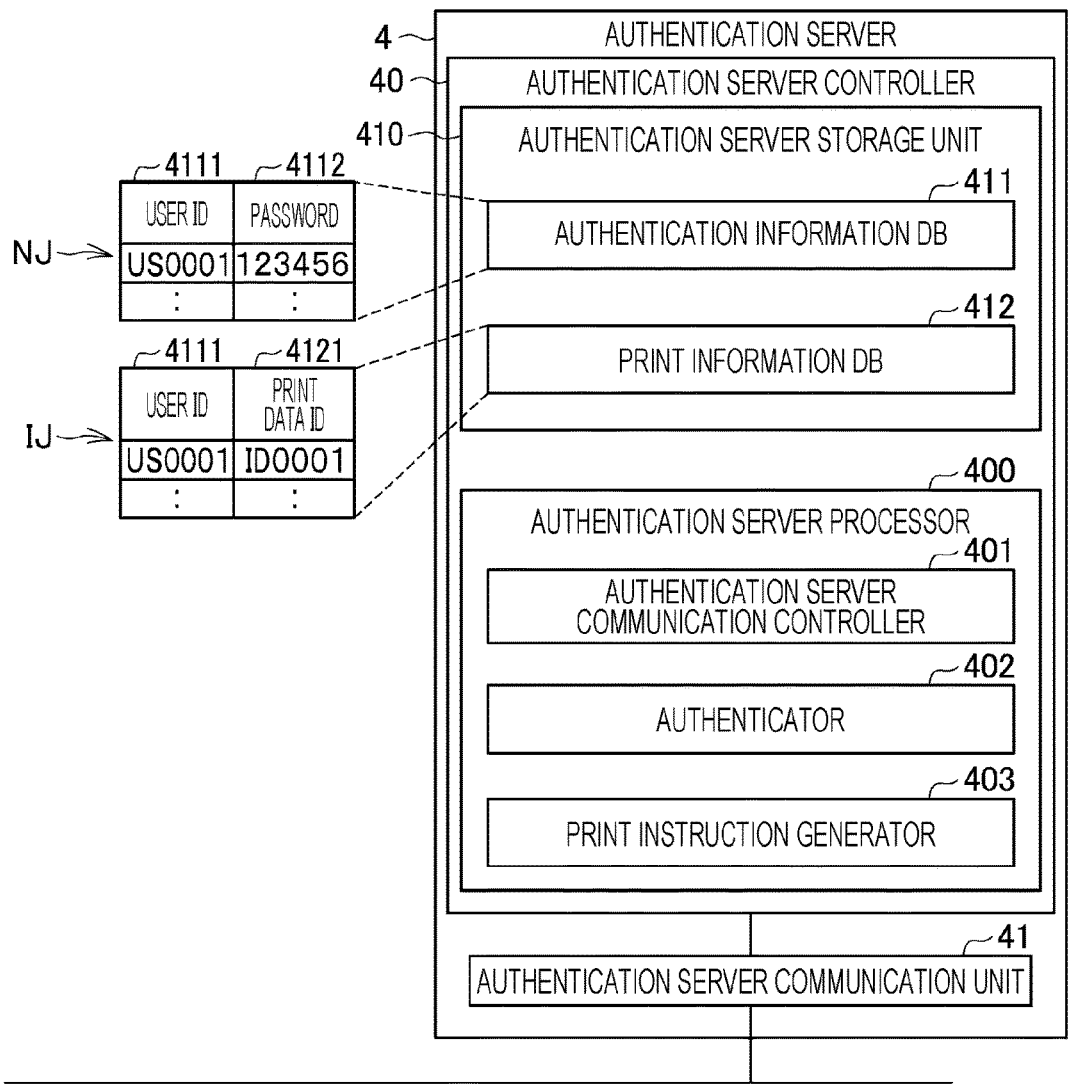

FIGS. 3A and 3B are block diagrams illustrating the configuration of the printing server 3 and the configuration of the authentication server 4.

First, the authentication server 4 is described.

The authentication server 4 includes an authentication server controller 40 and an authentication server communication unit 41.

The authentication server controller 40 includes an authentication server processor 400 and an authentication server storage unit 410 and controls each unit of the authentication server 4. The authentication server processor 400 is a processor that is a CPU, an MPU, or the like and executes a program. The authentication server controller 40 controls each unit of the authentication server 4 by causing the authentication server processor 400 to read a control program stored in the authentication server storage unit 410. The authentication server processor 400 functions as an authentication server communication controller 401, an authenticator 402, and a print instruction generator 403 by reading and executing the control program.

The authentication server storage unit 410 includes a memory that stores a program to be executed by the authentication server processor 400 and data to be processed by the authentication server processor 400. The authentication server storage unit 410 stores the control program to be executed by the authentication server processor 400, an authentication information DB 411, a printing information DB 412, and other various data. The authentication server storage unit 410 includes a nonvolatile storage region. The authentication server storage unit 410 further includes a volatile storage region that may constitute a work area for the authentication server processor 400.

The authentication information DB 411 is a database that stores authentication information NJ as a record.

The printing information DB 412 is a database that stores print information IJ as a record. The print information IJ as a single record includes the user ID 4111 and the print data ID 4121.

The print data ID 4121 is identification information of the print data 3131.

The authentication server communication unit 41 is a communication interface having a communication circuit, a connector, and the like that conform to the predetermined communication standard. The authentication server communication unit 41 communicates with the printing device 1 and the printing server 3 in accordance with control by the authentication server controller 40.

As described above, the authentication server processor 400 functions as the authentication server communication controller 401, the authenticator 402, and the print instruction generator 403.

The authentication server communication controller 401 communicates with the printing device 1 and the printing server 3 via the authentication server communication unit 41.

The authenticator 402 performs user authentication based on the authentication information NJ entered in the printing device 1.

The print instruction generator 403 generates print instruction information indicating a print instruction when the user authentication by the authenticator 402 is successful. After generating the print instruction information, the print instruction generator 403 outputs the generated print instruction information to the authentication server communication controller 401.

Next, the configuration of the printing server 3 is described.

The printing server 3 includes a printing server controller 30 and a printing server communication unit 31.

The printing server controller 30 includes a printing server processor 300 and a printing server storage unit 310 and controls each unit of the printing server 3. The printing server processor 300 is a processor that is a CPU, an MPU, or the like and executes a program. The printing server controller 30 controls each unit of the printing server 3 by causing the printing server processor 300 to read a control program stored in the printing server storage unit 310. The printing server processor 300 functions as a server driver executor 301 by reading a server printer driver 311. In addition, the printing server processor 300 functions as a management program executor 302 by reading a management program 312.

The printing server storage unit 310 includes a memory that stores a program to be executed by the printing server processor 300 and data to be processed by the printing server processor 300. The printing server storage unit 310 stores the control program to be executed by the printing server processor 300, the server printer driver 311, the management program 312, a print data management DB 313, a printing device management DB 314, the change authentication printing setting information 315, and other various data. The printing server storage unit 310 includes a nonvolatile storage region. The printing server storage unit 310 further includes a volatile storage region that may constitute a work area for the printing server processor 300.

The printing server storage unit 310 corresponds to an example of a "server storage unit".

The server printer driver 311 is a program relating to the transmission and reception of the print data 3131.

The management program 312 is a program relating to the management of the print data 3131.

The print data management DB 313 is a database in which the print data 3131 transmitted from the terminal device 2 is managed. A single record stored in the print data management DB 313 includes the user ID 4111, the print data ID 4121, and the print data 3131.

The printing device management DB 314 is a database in which the printing device 1 is managed. A single record stored in the printing device management DB 314 includes the printing device ID 112 and communication information 3141.

The communication information 3141 is information for communication with the printing device 1 identified by the printing device ID 112 associated with the communication information 3141 in the same record. The communication information 3141 is address information, for example.

The change authentication printing setting information 315 is information for changing the terminal authentication printing setting information 213 and indicates a setting relating to the authentication printing. The change authentication printing setting information 315 includes the same setting item as that of the terminal authentication printing setting information 213.

The printing server communication unit 31 is a communication interface having a communication circuit, a connector, and the like that conform to the predetermined communication standard and communicates with the printing device 1, the terminal device 2, and the authentication server 4 in accordance with control by the printing server controller 30.

As described above, the printing server processor 300 functions as a server driver executor 301 and a management program executor 302.

The server driver executor 301 functions as a print data receiver 3011 and a server print data transmitter 3012.

The print data receiver 3011 communicates with the terminal device 2 via the printing server communication unit 31. The print data receiver 3011 receives the print data 3131 from the terminal device 2.

The server print data transmitter 3012 transmits the print data 3131 to the printing device 1 via the printing server communication unit 31.

The management program executor 302 functions as a print information transmitter 3021, a database processor 302, a request information receiver 3023, and an authentication printing setting information transmitter 3024.

The print information transmitter 3021 communicates with the authentication server 4 via the printing server communication unit 31. The print information transmitter 3021 generates print information IJ and transmits the generated print information IJ to the authentication server 4.

The database processor 3022 executes processing relating to various databases stored in the printing server storage unit 310. When the print data receiver 3011 outputs the print data 3131, the database processor 3022 generates the print data ID 4121 and associates the generated print data ID 4121, the print data 3131 output by the print data receiver 3011, and the user ID 4111 associated with the print data 3131 and causes the print data ID 4121, the print data 3131, and the user ID 4111 to be stored as a single record in the print data management DB 313.

The request information receiver 3023 receives request information from the terminal device 2 via the printing server communication unit 31.

When the request information receiver 3023 receives the request information, the authentication printing setting information transmitter 3024 reads the change authentication printing setting information 315 from the printing server storage unit 310 and transmits, to the terminal device 2, the change authentication printing setting information 315 as a response to the request information.

Next, an operation of the printing system 1000 is described.

The operation of the printing system 1000 in the authentication printing is described with reference to FIGS. 4 and 5. In the description using FIGS. 4 and 5, a setting value indicating the server print queue 316 is set in the print queue setting item of the terminal authentication printing setting information 213, and a setting value indicating that a process relating to the user ID 4111 is valid is set in the user ID setting item of the terminal authentication printing setting information 213.

First, the operation of the printing system 1000 until the user P registers print data 3131 in the printing server 3 in the authentication printing is described. In the present embodiment, registering the print data 3131 in the printing server 3 means that a record including the print data 3131 generated by the terminal device 2 is newly stored in the print data management DB 313.

Figure 4:
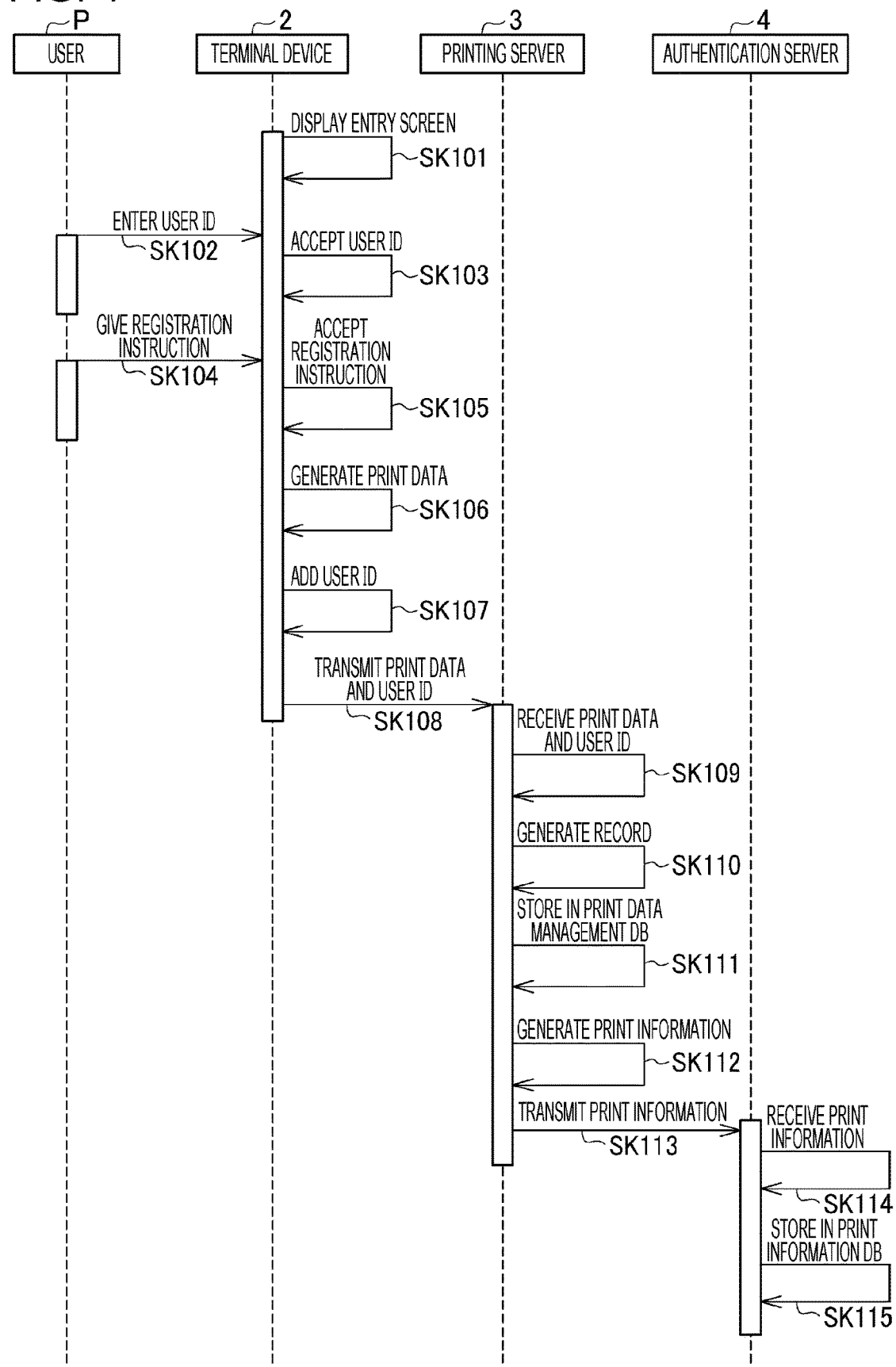
FIG. 4 is a sequence diagram illustrating an operation of the printing system.

FIG. 4 is a sequence diagram illustrating the operation of the printing system 1000.

The user ID processor 2012 of the terminal device 2 causes the terminal display unit 22 to display the entry screen (step SK101).

The user P enters the user ID 4111 on the entry screen displayed by the terminal device 2 (step SK102).

The user ID processor 2012 of the terminal device 2 accepts the entry of the user ID 4111 via the entry screen (step SK103).

The user P gives a registration instruction to instruct the terminal device 2 to register the print data 3131 generated by the terminal device 2 in the printing server 3 (step SK104).

Upon accepting the registration instruction from the user P (step SK105), the print data generator 2011 of the terminal device 2 generates the print data 3131 (step SK106).

Next, the user ID processor 2012 adds the user ID 4111 accepted in step SK103 to the print data 3131 generated in step SK106 (step SK107).

Next, the terminal print data transmitter 2013 transmits the print data 3131 having the user ID 4111 added thereto to the printing server 3 (step SK108).

The print data receiver 3011 of the printing server 3 receives the print data 3131 having the user ID 4111 added thereto from the terminal device 2 (step SK109).

Next, the database processor 3022 generates, based on the print data 3131 received by the print data receiver 3011, a new record to be stored in the print data management DB 313 (step SK110).

In step SK110, the database processor 3022 generates a print data ID 4121. After that, in step SK110, the database processor 3022 generates the record including the generated print data ID 4121, the received print data 3131, and the user ID 4111 added to the print data 3131.

The database processor 3022 causes the newly generated record to be stored in the print data management DB 313 (step SK111).

The print information transmitter 3021 generates print information based on the record stored in step SK111 (step SK112) and transmits the generated print information to the authentication server 4 (step SK113).

The print information generated in step SK112 includes the print data ID 4121 and the user ID 4111 that are included in the record stored in the step SK111.

The authentication server communication controller 401 of the authentication server 4 receives the print information from the printing server 3 (step SK114) and causes the received print information to be stored in the print information DB 412 (step SK115).

Next, the operation of the printing system 1000 in the case where the printing device 1 performs printing based on the print data 3131 registered in the printing server 3 in the authentication printing is described.

Figure 5:
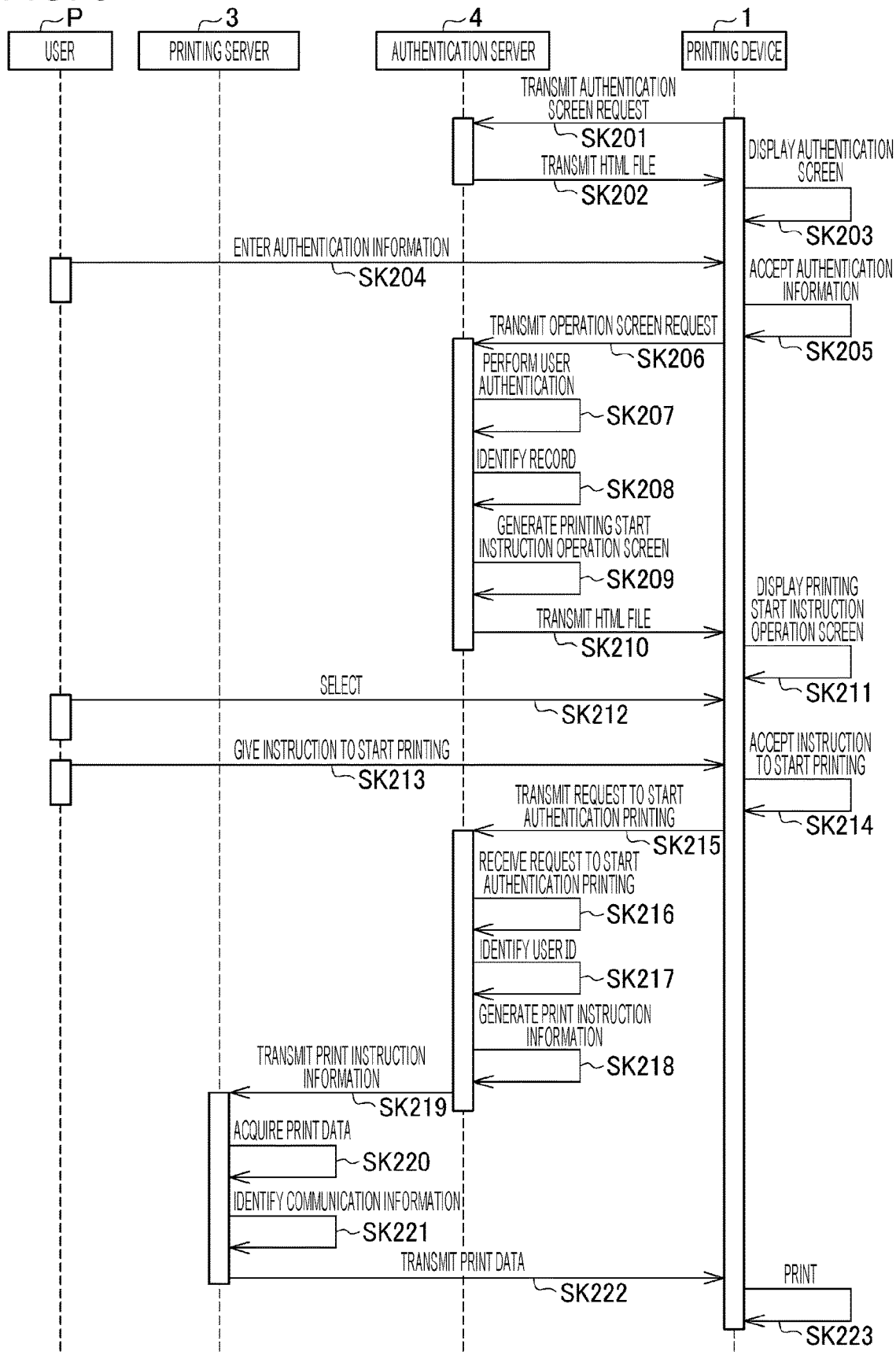
FIG. 5 is a sequence diagram illustrating the operation of the printing system.

FIG. 5 is a sequence diagram illustrating the operation of the printing system 1000.

The browser executor 103 of the printing device 1 uses the printing device communication unit 11 to transmit an authentication screen request to the authentication server 4 (step SK201).

Upon receiving the authentication screen request, the authentication server communication controller 401 of the authentication server 4 transmits, to the printing device 1, an HTML file for displaying the authentication screen (step SK202).

When the browser executor 103 of the printing device 1 receives the HTML file for displaying the authentication screen from the authentication server 4, the printing device display unit 12 displays the authentication screen (step SK203).

The user P enters the authentication information NJ in the printing device 1 based on the authentication screen displayed by the printing device 1 (step SK204).

The browser executor 103 of the printing device 1 accepts the authentication information NJ entered by the user P (step SK205).

Next, the browser executor 103 transmits an operation screen request to the authentication server 4 (step SK206).

The operation screen request is information requesting an HTML file for displaying the printing start instruction operation screen. The printing start instruction operation screen is a screen on which the user P performs an operation of instructing to start printing. The operation screen request includes the authentication information NJ entered by the user P.

When the authentication server communication controller 401 receives the operation screen request, the authenticator 402 of the authentication server 4 performs user authentication based on the authentication information NJ included in the received operation screen request (step SK207).

In step SK207, the authenticator 402 references the authentication information DB 411 and determines whether the authentication information NJ included in the received operation screen request is already stored as a single record in the authentication information DB 411. When the authenticator 402 determines that the authentication information NJ is not stored, the authenticator 402 determines that the user authentication fails. When the authenticator 402 determines that the authentication information NJ is already stored, the authenticator 402 determines that the user authentication is successful.

When the authenticator 402 determines that the user authentication is successful, the authenticator 402 identifies, from the print information DB 412, the print information IJ having the user ID 4111 for which the user authentication is successful (step SK208).

The authenticator 402 generates a printing start instruction operation screen for the user P to give an instruction to start printing based on the print data 3131 identified by the print data ID 4121 included in the identified print information IJ (step SK209).

The printing start instruction operation screen is a screen displaying, as a list, the print data 3131 of the user P for which the user authentication is successful. In addition, the printing start instruction operation screen includes a software button for selecting one or more print data items 3131 from the list of the print data 3131. Furthermore, the printing start instruction operation screen includes, for example, a software button for the user P to perform an operation of giving an instruction to start printing.

The authentication server communication controller 401 transmits, to the printing device 1, the HTML file for displaying the printing start instruction operation screen generated by the authenticator 402 (step SK210).

When the authenticator 402 determines that the user authentication fails, the authenticator 402 does not transmit, to the printing device 1, the HTML file for displaying the printing start instruction screen.

When the browser executor 103 of the printing device 1 receives the HTML file for displaying the printing start instruction operation screen via the printing device communication unit 11, the printing device display unit 12 displays the printing start instruction operation screen (step SK211).

The user P selects, on the printing start instruction operation screen displayed by the printing device 1, one or more print data items 3131 to be printed by the printing device 1 from the print data 3131 (step SK212).

The user P performs an operation of giving an instruction to start printing on the printing start instruction operation screen displayed by the printing device 1 (step SK213).

The browser executor 103 of the printing device 1 accepts the printing start instruction given by the user P (step SK214).

Upon accepting the printing start instruction, the browser executor 103 transmits, to the authentication server 4, an authentication printing start request to start the authentication printing (step SK215).

The authentication printing start request transmitted in step SK215 includes all one or more print data IDs 4121 of the one or more print data items 3131 selected by the user P in step SK212. In addition, the authentication printing start request transmitted in step SK215 includes the printing device ID 112 stored in the printing device 1.

The authentication server communication controller 401 of the authentication server 4 receives the authentication printing start request from the printing device 1 (step SK216).

Next, the print instruction generator 403 references the print information DB 412 and identifies the user ID 4111 associated with the one or more print data IDs 4121 included in the authentication printing start request (step SK217).

Next, the print instruction generator 403 generates print instruction information indicating a print instruction and transmits the generated print instruction information to the printing server 3 (step SK218). The print instruction information includes the one or more print data IDs 4121 included in the authentication printing start request, the identified user ID 4111, and the printing device ID 112 included in the authentication printing start request.

The server print data transmitter 3012 of the printing server 3 receives the print instruction information from the authentication server 4 (step SK219).

The server print data transmitter 3012 acquires, from the print data management DB 313, the one or more print data items 3131 associated with a combination of the one or more print data IDs 4121 included in the received print instruction information and the user ID 4111 (step SK220).

Next, the server print data transmitter 3012 identifies communication information 3141 associated with the printing device ID 112 included in the received print instruction information (step SK221).

The server print data transmitter 3012 transmits, to the printing device 1, the one or more print data items 3131 acquired in step SK220 based on the communication information 3141 identified in step SK221 (step SK222).

When the printing device communication controller 101 receives the one or more print data items 3131, the printing controller 102 of the printing device 1 controls the printing unit 14 and the heating unit 15 to perform printing based on the received one or more print data items 3131 (step SK223).

Figure 6:
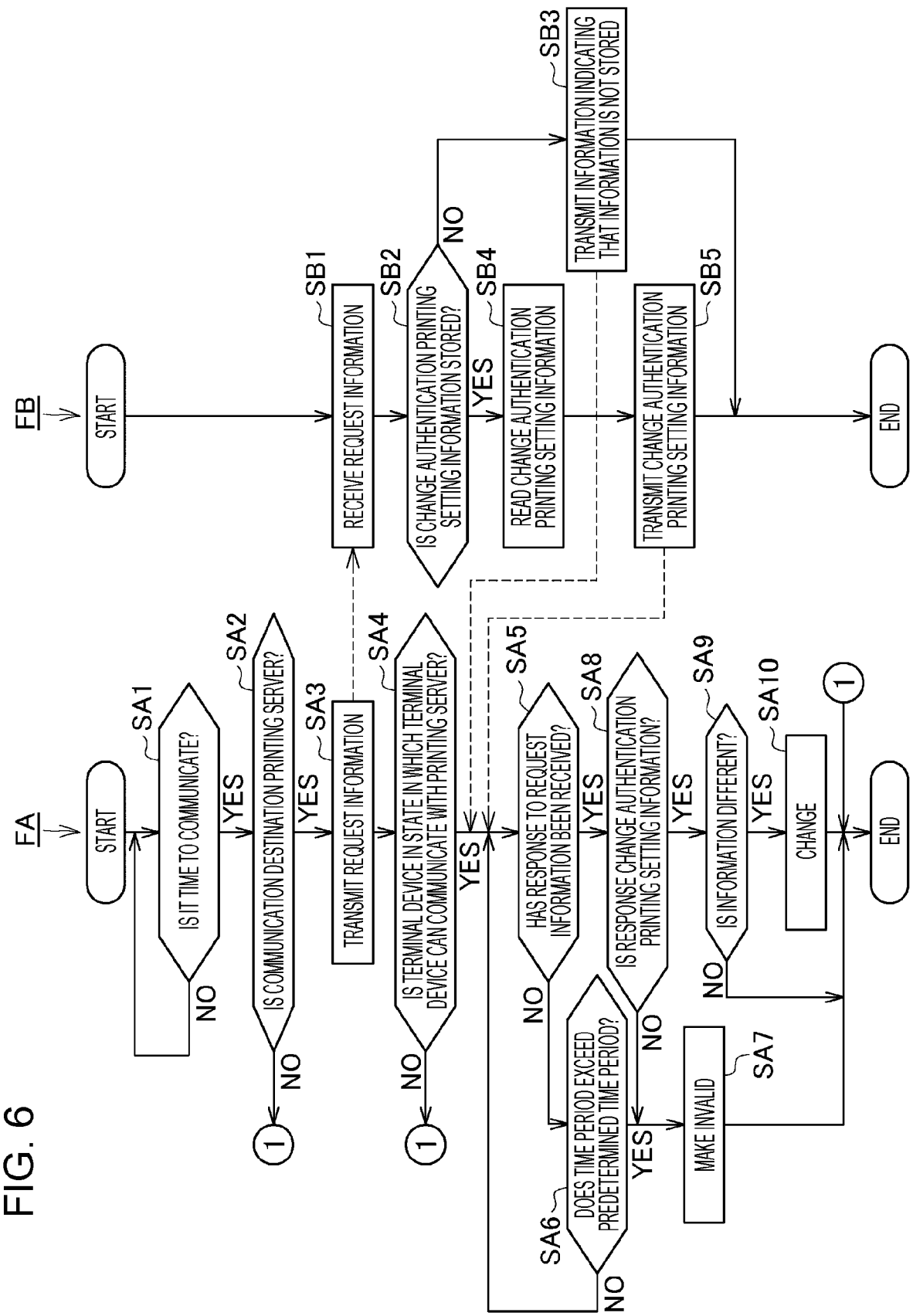
FIG. 6 is a flowchart illustrating an operation of the printing system.

To perform the authentication printing illustrated in FIGS. 4 and 5, the printing system 1000 performs an operation illustrated in FIG. 6.

FIG. 6 is a flowchart illustrating the operation of the printing system 1000. In FIG. 6, a flowchart FA illustrates an operation of the terminal device 2 and a flowchart FB illustrates an operation of the printing server 3.

The request information transmitter 2014 of the terminal device 2 determines whether it is time for the terminal driver executor 201 to perform communication (step SA1). The time for the terminal driver executor 201 to perform communication is, for example, a time when a terminal print queue 214 is newly generated, a time when the user P starts the authentication printing, or the like.

When the request information transmitter 2014 determines that it is time for the terminal driver executor 201 to start communication (YES in step SA1), the request information transmitter 2014 determines whether a communication destination of the terminal driver executor 201 is the printing server 3 (step SA2).

When the request information transmitter 2014 determines that the communication destination of the terminal driver executor 201 is not the printing server 3 (NO in step SA2), the request information transmitter 2014 ends the process.

On the other hand, when the request information transmitter 2014 determines that the communication destination of the terminal driver executor 201 is the printing server 3 (YES in step SA2), the request information transmitter 2014 transmits the request information to the printing server 3 (step SA3).

As illustrated in the flowchart FB, the request information receiver 3023 of the printing server 3 receives the request information from the terminal device 2 (step SB1).

Next, the authentication printing setting information transmitter 3024 determines whether the change authentication printing setting information 315 is already stored in the printing server storage unit 310 (step SB2).

When the authentication printing setting information transmitter 3024 determines that the change authentication printing setting information 315 is not stored in the printing server storage unit 310 (NO in step SB2), the authentication printing setting information transmitter 3024 transmits, as a response to the request information, information indicating that the change authentication printing setting information 315 is not stored to the terminal device 2 (step SB3).

The authentication printing setting information transmitter 3024 determines that the change authentication printing setting information 315 is already stored in the printing server storage unit 310 (YES in step SB2), the authentication printing setting information transmitter 3024 reads the change authentication printing setting information 315 from the printing server storage unit 310 (step SB4).

Next, the authentication printing setting information transmitter 3024 transmits, as a response to the request information, the read change authentication printing setting information 315 to the terminal device 2 (step SB5).

As illustrated in the flowchart FA, the request information transmitter 2014 determines whether the request information transmitter 2014 is in a state in which the request information transmitter 2014 can communicate with the printing server 3 (step SA4).

In step SA4, when the request information transmitter 2014 can transmit the request information, the request information transmitter 2014 determines that the request information transmitter 2014 is in the state in which the request information transmitter 2014 can communicate with the printing server 3. In step SA4, when the request information transmitter 2014 cannot transmit the request information, the request information transmitter 2014 determines that the request information transmitter 2014 is not in the state in which the request information transmitter 2014 can communicate with the printing server 3.

When the request information transmitter 2014 determines that the request information transmitter 2014 is not in the state in which the request information transmitter 2014 can communicate with the printing server 3 (NO in step SA4), the request information transmitter 2014 ends the process. The case where the request information transmitter 2014 determines that the request information transmitter 2014 is not in the state in which the request information transmitter 2014 can communicate with the printing server 3 is, for example, a case where a network address of the printing server 3 is changed.

On the other hand, when the authentication printing setting information receiver 2015 determines that the authentication printing setting information receiver 2015 is in the state in which the authentication printing setting information receiver 2015 can communicate with the printing server 3 (YES in step SA4), the authentication printing setting information receiver 2015 determines whether the authentication printing setting information receiver 2015 has received a response to the request information transmitted by the request information transmitter 2014 (step SA5).

When the authentication printing setting information receiver 2015 determines that the authentication printing setting information receiver 2015 has not received the response to the request information (NO in step SA5), the authentication printing setting information receiver 2015 determines whether a time period that starts from the transmission of the request information by the request information transmitter 2014 and is before the reception of the response to the request information exceeds a predetermined time period (step SA6). That is, the authentication printing setting information receiver 2015 determines whether a timeout time has passed in step SA6.

When the authentication printing setting information receiver 2015 determines that the time period that starts from the transmission of the request information and is before the reception of the response exceeds the predetermined time period (YES in step SA6), the changer 2016 makes the terminal authentication printing setting information 213 invalid (step SA7).

In step SA7, for example, the changer 2016 executes predetermined information processing on the terminal authentication printing setting information 213 so as to prevent the functions of the driver executor 201 from referencing the terminal authentication printing setting information 213.

On the other hand, when the authentication printing setting information receiver 2015 determines that the time period that starts from the transmission of the request information and is before the reception of the response does not exceed the predetermined time period (NO in step SA6), the authentication printing setting information receiver 2015 returns the process to step SA5.

Returning to the description of step SA5, when the authentication printing setting information receiver 2015 determines that the authentication printing setting information receiver 2015 has received the response to the request information (YES in step SA5), the authentication printing setting information receiver 2015 determines whether the received response to the request information is the change authentication printing setting information 315 (step SA8).

When the authentication printing setting information receiver 2015 determines that the received response to the request information is not the change authentication printing setting information 315 (NO in step SA8), the authentication printing setting information receiver 2015 performs the process of step SA7.

On the other hand, when the authentication printing setting information receiver 2015 determines that the response to the request information is the change authentication printing setting information 315 (YES in step SA8), the changer 2016 determines whether the received change authentication printing setting information 315 is different from the terminal authentication printing setting information 213 (step SA9).

When the changer 2016 determines that the change authentication printing setting information 315 is the same as the terminal authentication printing setting information 213 (NO in step SA9), the changer 2016 ends the process.

When the changer 2016 determines that the change authentication printing setting information 315 is different from the terminal authentication printing setting information 213 (YES in step SA9), the changer 2016 matches the detail of the terminal authentication printing setting information 213 with the detail of the change authentication printing setting information 315 (step SA10).

By performing the operation illustrated in FIG. 6, the terminal authentication printing setting information 213 is automatically changed. Therefore, when a setting relating to the authentication printing is set in the terminal device 2 due to the introduction of another terminal device 2, the replacement of the terminal device 2, or the like for the authentication printing, the user P does not need to manually set the terminal device 2. Previously, when an OS (operating system) of the terminal device 2 and an OS of the printing server 3 were Windows (registered trademark) or the like and were the same, a setting relating to the authentication printing was automatically synchronized between the terminal device 2 and the printing server 3. On the other hand, previously, when the OS of the terminal device 2 and the OS of the printing server 3 were different from each other, for example, when the OS of the terminal device 2 was Linux (registered trademark) and the OS of the printing server 3 was Windows, the setting relating to the authentication printing was not automatically synchronized between the terminal device 2 and the printing server 3. Therefore, previously, when the OS of the terminal device 2 and the OS of the printing server 3 were different from each other, the user P had to manually set the setting relating to the authentication printing in the terminal device 2. However, in the printing system 1000 according to the present embodiment, the setting relating to the authentication printing is automatically synchronized between the terminal device 2 and the printing server 3 regardless of the OSs. Therefore, even when the OS of the terminal device 2 and the OS of the printing server 3 are different from each other, it is possible to set the setting relating to the authentication printing in the terminal device 2 without effort of the user P.

Next, modifications of the embodiment described above are described.

First Modification

The aforementioned embodiment exemplifies the case where each of the terminal authentication printing setting information 213 and the change authentication printing setting information 315 includes the print queue setting item and the user ID setting item. In the first modification, each of the terminal authentication printing setting information 213 and the change authentication printing setting information 315 includes a print function limit item in addition to the two setting items or instead of at least one of the two setting items.

The print function limit item is a setting item set as a setting value indicating whether a limit on the print function is valid or invalid. For example, it is assumed that when a setting value indicating the validity is set in the print function limit item, color printing is limited. In this example, the print data generator 2011 does not accept the specifying of the color printing as a printing condition during the authentication printing. Therefore, in this example, the color printing is not performed in the printing system 1000.

Second Modification

The aforementioned embodiment exemplifies the case where each of the terminal authentication printing setting information 213 and the change authentication printing setting information 315 is information including the printing queue setting item and the user ID setting item. In the second modification, each of the terminal authentication printing setting information 213 and the change authentication printing setting information 315 includes a specific user availability item in addition to the setting items described in the embodiment and the first modification or instead of at least one of the setting items described in the embodiment and the first modification.

The specific user availability item is a setting item in which a setting value indicating whether the authentication printing is available for a specific user P such as a guest is set. For example, it is assumed that a setting value indicating that the authentication printing is not available is set in the specific user availability item. In this case, when a user ID 4111 is not entered or when a specific user ID 4111 is entered, the print data generator 2011 does not generate print data 3131 in the authentication printing.

According to the aforementioned embodiment and the modifications, the following effects are obtained.

As described above, the printing system 1000 that performs the authentication printing includes the terminal device 2, the printing server 3 that receives print data 3131 from the terminal device 2, and the printing device 1 that performs printing based on the print data 3131 received by the printing server 3. The terminal device 2 stores the terminal authentication printing setting information 213. The printing server 3 stores the change authentication printing setting information 315 for changing the terminal authentication printing setting information 213. The terminal device 2 transmits, to the printing server 3, request information requesting the change authentication printing setting information 315. Upon receiving the request information, the printing server 3 transmits the change authentication printing setting information 315 to the terminal device 2. The terminal device 2 changes the terminal authentication printing setting information 213 based on the change authentication printing setting information 315 received from the printing server 3.

According to the printing system 1000, since the setting relating to the authentication printing is automatically set in the terminal device 2, the setting relating to the authentication printing can be set in the terminal device 2 without effort of the user P.

When the detail of the received change authentication printing setting information 315 is different from the detail of the terminal authentication printing setting information 213, the terminal device 2 matches the detail of the terminal authentication printing setting information 213 with the detail of the change authentication printing setting information 315.

According to this, the setting relating to the authentication printing is automatically synchronized between the terminal device 2 and the printing server 3. Therefore, the same setting as the setting stored in the printing server 3 and relating to the authentication printing can be set in the terminal device 2 without effort of the user P.

In a state in which the terminal device 2 can communicate with the printing server 3, when the terminal device 2 does not receive the change authentication printing setting information 315 from the printing server 3 after transmitting the request information, the terminal device 2 makes the terminal authentication printing setting information 213 invalid.

According to this, it is possible to make invalid the setting relating to the authentication printing and set in the terminal device 2 when the printing server 3 does not support the authentication printing. Therefore, it is possible to prevent the terminal device 2 from operating based on the setting relating to the authentication printing regardless of the fact that the printing server 3 does not support the authentication printing. For example, it is possible to prevent the terminal device 2 from accepting the entry of the user ID 4111 regardless of the fact that the printing server 3 does not support the authentication printing.

The printing device 1 accepts the entry of the authentication information NJ from the user P, receives the print data 3131 from the printing server 3 when the user authentication based on the received authentication information NJ is successful, and performs printing based on the received print data 3131.

According to this, the setting relating to the authentication printing that is started in response to the entry of the authentication information NJ in the printing device 1 can be set in the terminal device 2 without effort of the user P.

The printing system 1000 includes the authentication server 4 that can communicate with the printing server 3. The authentication server 4 receives the entered authentication information NJ from the printing device 1, performs the user authentication based on the received authentication information NJ, and transmits the print instruction information indicating the print instruction to the printing server 3 when the user authentication is successful. The printing server 3 transmits the print data 3131 to the printing device 1 based on the print instruction information received from the authentication server 4.

According to this, the setting relating to the authentication printing using the authentication server 4 separated from the printing server 3 can be set in the terminal device 2 without effort of the user P.

The change authentication printing setting information 315 indicates a setting specifying an output destination of the terminal print queue 214 to the server print queue 316 for the authentication printing.

According to this, since the output destination of the terminal print queue 214 can be automatically set, the output destination of the terminal print queue 214 can be set to the print queue included in the printing server 3 and provided for the authentication printing without effort of the user P.

The change authentication printing setting information 315 indicates a setting for making valid the function of adding a user ID 4111 to be used for the authentication printing to the print data 3131.

According to this, since it is possible to automatically set a setting for adding the user ID 4111 to be used for the authentication printing, the setting for adding the user ID 4111 to the print data 3131 can be set in the terminal device 2 without effort of the user P.

The change authentication printing setting information 315 indicates a setting for making valid the function of limiting the print function.

According to this, since the limit on the print function can be automatically set, a setting for limiting the print function can be set in the terminal device 2 without effort of the user P.

The change authentication printing setting information 315 indicates a setting for determining whether the authentication printing is available for a specific user P.

According to this, since the setting for determining whether the authentication printing is available for the specific user P can be automatically set, the setting for determining whether the authentication printing is available for the specific user P can be set in the terminal device 2 without effort of the user P.

The terminal device 2 performs the authentication printing together with the printing server 3 and the printing device 1 that performs printing based on the print data 3131 received from the printing server 3. The terminal device 2 includes the terminal print data transmitter 2013 that transmits the print data 3131 to the printing server 3, the terminal storage unit 210 that stores the terminal authentication printing setting information 213, the request information transmitter 2014 that transmits request information requesting the change authentication printing setting information 315 to the printing server 3, the authentication printing setting information receiver 2015 that receives the change authentication printing setting information 315 from the printing server 3 when the printing server 3 receives the request information, and the changer 2016 that changes the terminal authentication printing setting information 213 based on the received change authentication printing setting information 315 when the authentication printing setting information receiver 2015 receives the change authentication printing setting information 315.

According to the terminal device 2, since the setting relating to the authentication printing can be automatically set in the terminal device 2, the setting relating to the authentication printing can be set in the terminal device 2 without effort of the user P.

The terminal printer driver 212 causes the terminal processor 200 to transmit the print data 3131 to the printing server 3, transmit the request information requesting the change authentication printing setting information 315 to the printing server 3, receive the change authentication printing setting information 315 from the printing server 3 when the printing server 3 receives the request information, and change the terminal authentication printing setting information 213 based on the received change authentication printing setting information 315 when the terminal processor 200 receives the change authentication printing setting information.

According to the terminal printer driver 212, since the setting relating to the authentication printing can be set in the terminal device 2, the setting relating to the authentication printing can be set in the terminal device 2 without effort of the user P.

The printing server 3 performs the authentication printing together with the terminal device 2 and the printing device 1. The printing server 3 includes the server print data transmitter 3012 that transmits, to the printing device 1, the print data 3131 received from the terminal device 2, the printing server storage unit 310 that stores the change authentication printing setting information 315 for changing the terminal authentication printing setting information 213, the request information receiver 3023 that receives, from the terminal device 2, request information requesting the change authentication printing setting information 315, and the authentication printing setting information transmitter 3024 that transmits, to the terminal device 2, the change authentication printing setting information 315 stored in the printing server storage unit 310 when the request information receiver 3023 receives the request information.

According to the printing server 3, since the setting relating to the authentication printing can be automatically set in the terminal device 2, the setting relating to the authentication printing can be automatically set in the terminal device 2 without effort of the user P.

The aforementioned embodiment and the modifications indicate only aspects and can be arbitrarily modified and applied.

For example, the aforementioned embodiment exemplifies the case where each of the terminal authentication printing setting information 213 and the change authentication printing setting information 315 includes the print queue setting item and the user ID setting item. However, the authentication printing setting information may include another type of setting item.

For example, although the aforementioned embodiment and the modifications exemplify the large format printer as the printing device 1, the printing device 1 is not limited to the large format printer. As the printing device 1, a multi-function machine having a function such as a scan function in addition to a print function and various printing devices such as a textile printing device that performs textile printing can be used.

In addition, the functions of the printing device controller 10, the terminal controller 20, the printing server controller 30, and the authentication server controller 40 may be implemented by a plurality of processors or a plurality of semiconductor chips.

In addition, the units illustrated in FIGS. 2 and 3 are an example and specific implementation forms of the units are not particularly limited. That is, hardware individually corresponding to the units may not be implemented and a single processor may execute a program to implement the functions of the units. Furthermore, in the aforementioned embodiment, some of the functions implemented by software may be implemented as hardware or some of the functions implemented as hardware may be implemented by software. Specific detailed configurations of other units of the printing device 1, the terminal device 2, the printing server 3, and the authentication server 4 can be arbitrarily changed.

In addition, for example, the steps of the operations illustrated in FIGS. 4 to 6 are obtained by dividing the operations based on the main contents of the processes in order to easily understand the operations of the units of the printing system 1000. The present disclosure is not limited by the method of dividing the operations into process units and the names of the process units. The operations may be divided into larger numbers of steps based on the contents of the processes. In addition, the operations may be divided such that one or more of steps includes a larger number of processes. The order of the steps may be appropriately changed without departing from the gist of the present disclosure.

What is claimed is:

1. A printing system that performs authentication printing, comprising:
a terminal device;
a printing server that receives print data from the terminal device, and
a printing device that performs printing based on the print data received by the printing server, wherein
the terminal device stores terminal authentication printing setting information indicating a setting relating to the authentication printing and set in the terminal device,
the printing server stores change authentication printing setting information for changing the terminal authentication printing setting information,
the terminal device transmits request information requesting the change authentication printing setting information to the printing server,
the printing server transmits the change authentication printing setting information to the terminal device upon receiving the request information,
the terminal device changes the terminal authentication printing setting information based on the change authentication printing setting information received from the printing server such that an authentication for the terminal device is updated, and
in a state in which the terminal device can communicate with the printing server, when the terminal device does not receive the change authentication printing setting information from the printing server after transmitting the request information, the terminal device makes the terminal authentication printing setting information invalid.

2. The printing system according to claim 1, wherein when a detail of the received change authentication printing setting information is different from a detail of the terminal authentication printing setting information, the terminal device matches the detail of the terminal authentication printing setting information with the detail of the change authentication printing setting information.

3. The printing system according to claim 1, wherein when the printing device accepts authentication information entered by a user, and user authentication based on the accepted authentication information is successful, the printing device receives the print data from the printing server and performs printing based on the received print data.

4. The printing system according to claim 3, further comprising an authentication server that can communicate with the printing server, wherein
the authentication server receives the entered authentication information from the printing device, performs user authentication based on the received authentication information, and transmits print instruction information indicating a print instruction to the printing server when the user authentication is successful, and
the printing server transmits the print data to the printing device based on the print instruction information received from the authentication server.

5. The printing system according to claim 1, wherein the change authentication printing setting information indicates a setting specifying an output destination of a print queue included in the terminal device to a print queue included in the printing server and provided for the authentication printing.

6. The printing system according to claim 1, wherein the change authentication printing setting information indicates a setting for making valid a function of adding, to the print data, identification information identifying a user and to be used for the authentication printing.

7. The printing system according to claim 1, wherein the change authentication printing setting information indicates a setting for making valid a function of limiting a print function.

8. The printing system according to claim 1, wherein the change authentication printing setting information indicates a setting for determining whether the authentication printing is available for a specific user.

9. A terminal device that performs authentication printing together with a printing server and a printing device that performs printing based on print data received from the printing server, comprising:
- a terminal print data transmitter that transmits the print data to the printing server;
- a terminal storage unit that stores terminal authentication printing setting information indicating a setting relating to the authentication printing and set in the terminal device;
- a request information transmitter that transmits, to the printing server, request information requesting change authentication printing setting information for changing the terminal authentication printing setting information;
- an authentication printing setting information receiver that receives the change authentication printing setting information from the printing server after the printing server receives the request information; and
- a changer that changes, based on the received change authentication printing setting information, the terminal authentication printing setting information stored in the terminal storage unit when the authentication printing setting information receiver receives the change authentication printing setting information such that an authentication for the terminal device is updated,
- wherein in a state in which the terminal device can communicate with the printing server, when the terminal device does not receive the change authentication printing setting information from the printing server after transmitting the request information, the terminal device makes the terminal authentication printing setting information invalid.

10. A non-transitory computer-readable storage medium storing a program to be executed by a processor of a terminal device that performs authentication printing together with a printing server and a printing device that performs printing based on print data received from the printing server, wherein
- the terminal device stores terminal authentication printing setting information indicating a setting relating to the authentication printing and set in the terminal device, and
- the program comprises causing the processor to:
- transmit the print data to the printing server;
- transmit, to the printing server, request information requesting change authentication printing setting information for changing the terminal authentication printing setting information;
- receive the change authentication printing setting information from the printing server after the printing server receives the request information; and
- change the terminal authentication printing setting information based on the received change authentication printing setting information when the processor receives the change authentication printing setting information such that an authentication for the terminal device is updated,
- wherein when the terminal device does not receive the change authentication printing setting information from the printing server after transmitting the request information, the terminal device makes the terminal authentication printing setting information invalid.

11. A printing server that performs authentication printing together with a terminal device and a printing device, comprising:
- a server print data transmitter that transmits, to the printing device, print data received from the terminal device;
- a server storage unit that stores change authentication printing setting information for changing terminal authentication printing setting information indicating a setting relating to the authentication printing and set in the terminal device;
- a request information receiver that receives, from the terminal device, request information requesting the change authentication printing setting information; and
- an authentication printing setting information transmitter that transmits the change authentication printing setting information stored in the server storage unit to the terminal device storing the terminal authentication printing setting information when the request information receiver receives the request information so that the terminal device can change the terminal authentication printing setting information based on the change authentication printing setting information such that an authentication for the terminal device is updated,
- wherein when the terminal device does not receive the change authentication printing setting information from the printing server after transmitting the request information, the terminal device makes the terminal authentication printing setting information invalid.

* * * * *